United States Patent
Fier

[11] 3,861,708
[45] Jan. 21, 1975

[54] HIGH STRENGTH AUXILIARY AXLE SUSPENSION SYSTEM FOR LOW FRAME WHEELED VEHICLES

[75] Inventor: Raymond L. Fier, Massillon, Ohio

[73] Assignee: TWM Manufacturing Company, Inc., Canton, Ohio

[22] Filed: Oct. 18, 1973

[21] Appl. No.: 407,768

[52] U.S. Cl. ........................... 280/124 F, 180/24.02
[51] Int. Cl. .............................................. B60g 11/46
[58] Field of Search ..... 280/124 F; 180/22 D, 22 E, 180/24.02; 267/18, 23, 24, 31

[56] References Cited
UNITED STATES PATENTS

| | | | |
|---|---|---|---|
| 3,390,895 | 7/1968 | Verdi | 180/24.02 |
| 3,433,528 | 3/1969 | Murray | 180/24.02 |
| 3,448,975 | 6/1969 | Verdi | 267/31 |
| 3,494,608 | 2/1970 | McGee | 267/31 |
| 3,617,072 | 11/1971 | Turner | 280/124 F |

*Primary Examiner*—Philip Goodman
*Assistant Examiner*—John A. Carroll
*Attorney, Agent, or Firm*—Hall and Myers

[57] ABSTRACT

Provided is a high strength auxiliary axle suspension system for wheeled vehicles whose frame members are relatively close to the road surface (usually about 24 inches, ground to frame clearance). The system comprises the automatic lift aspects of an inverted semi-elliptic leaf spring which normally biases an axle off of the road surface, and an air bag mechanism which, when inflated works against the upward bias of the spring to drive the axle downwardly until the wheel engages the road surface. Included within the system is a load arm comprising a leaf spring retaining means and means for securing the load arm to the auxiliary axle of the vehicle by bolt means. The spring retaining means includes a generally horizontal bottom portion and a pair of vertical walls connected to the horizontal portion, thereby defining a spring retaining area therewithin. The means for securing the load arm to the auxiliary axle are located in the vertical walls such that the bolt means do not extend substantially below the plane of the horizontal bottom portion. Also located integrally upon the vertical walls are upwardly extending arms which terminate in a platform for retaining the air bag system. In certain embodiments, the load arm is located with its center substantially directly aligned with the center line of the axle and there is provided on each arm a platform which terminates in an air bag such that one air bag is located forward, and the other aft of the center line of the axle. The load arm mechanism so described allows both the spring and the air bag system to be located substantially directly under the frame member of the vehicle, thereby to achieve high strength, and at the same time it is so designed to provide for adequate clearance above the road surface when the axle is lowered, despite the fact that the vehicle has an inordinately low frame.

1 Claim, 10 Drawing Figures

HIGH STRENGTH AUXILIARY AXLE SUSPENSION SYSTEM FOR LOW FRAME WHEELED VEHICLES

This invention relates to auxiliary axle suspension systems for wheeled vehicles. More particularly, this invention relates to auxiliary axle suspension systems of improved strength and durability which may be advantageously used on wheeled vehicles having inordinately low ground to frame clearance.

It is well known that in a load carrying wheeled vehicle, the greater the number of load carrying wheels, the greater the load which can be carried without damage to the road surface. Indeed, while most states limit the gross weight of a vehicle traveling on state roads, many states specify a gross weight which each axle of the vehicle may support. In such cases it follows that the greater the number of wheel-bearing axles on the vehicle, the greater will be the allowed gross weight. Unfortunately, the greater the number of axles spaced longitudinally of the vehicle, the greater the tire scuffing when the vehicle turns and the greater the power requirements to overcome the drag of such scuffing.

In order to alleviate the aforesaid tire scuffing when multiple axle suspensions are employed, it has been proposed to steer or caster one or more of such multiple axles. This, however, is a very complex and expensive solution which is not always adaptable to existing vehicles.

U.S. Pat. No. 3,285,621, and 3,617,072 disclose unique and highly advantageous systems for overcoming this problem in the art by providing a third axle system which employs a mechanism now known in the industry as a "positive return" system.

This "positive return" system generally comprises an inverted leaf spring which normally biases the wheel off of the road surface, and an air bag (pneumatic chamber) system which when expanded, usually by applying air from the brake system through a mechanism located in the cab of the truck, drives the axle downwardly against the upward bias of the spring until the wheel engages the road surface. By release of the air pressure in the pneumatic system, the inverted leaf spring automatically flexes back to its inverted position thus automatically lifting the wheel from the road surface.

Copending U.S. Pat. application Ser. No. 336,289 filed Feb. 27, 1973, in the name of Raymond M. Scanlon and Stephen Turner, Jr., and bearing common ownership rights with this application, discloses a significant improvement upon the concept set forth in the aforementioned patents by providing a unique high strength auxiliary axle suspension system capable of being certified, in accordance with present regulations, at 18,000 pounds or more per axle. In addition, because of the unique design of that system, such a system is useful on a wide range of wheeled vehicles having "relatively high," "relatively low" and "inordinately low" frames.

As defined in this aforementioned patent application, and as used herein, the term "relatively high" frames are those having a clearance greater than about 35 inches above the ground, "relatively low" frames are those between about 27-34 inches from the ground, and "inordinately low" frames are those less than 27 inches and usually between about 24-26 inches from the ground.

The invention described in the aforementioned patent application, the entire disclosure of which is incorporated herein by reference, accomplished its purpose by providing a unique auxiliary axle suspension system for wheeled vehicles having an axle and at least one longitudinal extending frame member, the system comprising at least one leaf spring, at least one vertically flexible pneumatic chamber, spring hanger means for retaining the leaf spring at its ends, means which retain the leaf spring at a point intermediate its ends in a normally upwardly biased configuration, and means for off-setting the pneumatic chamber from the vertical plane of the axle when the system is connected thereto, said off-setting means locating the pneumatic chamber between the axle and the frame member such that when the pneumatic pressure is applied to the chamber it expands, forcing the axle downwardly against the normal upward bias of the leaf spring. High strength is built into such a system by employing either and preferably both of two unique concepts. In the first concept, the system includes means for taking up the horizontal force components of breaking and dynamic operating forces, which means are located substantially directly under the longitudinally expanding frame member. In the second concept, the vertically flexible chamber is located not only between the axle and the frame member but in a spread configuration as well.

The term "in a spread configuration" as it applies to the location of the vertically flexible pneumatic chamber(s) is used in that copending application, and is used herein, to define a position in which the chambers aid in improving the strength of the system despite the fact that they are offset from the vertical plane of the axle, by spreading or moving the chambers outwardly, as from the inward position which they now assume in certain multibag prior art devices described in that application. Such spreading is generally definable in terms of an inward limit for offset. That is to say the term "in a spread configuration" means that the vertical center line (i.e., neutral axis or center of gravity) of the chamber(s), should not be spaced inwardly from the center line (as defined above) of the frame member more than about 20 percent of the width (parallel to the axle, which in the case of a conventional round chamber is its diameter) of the chamber when expanded, and preferably less than about 10 percent.

More precise location will vary as different parts or types of equipment are employed. Usually, and with conventional equipment, it is preferable that the center line of the chamber(s) be not more than about 1¾ inches and preferably less than about 1 inch, inwardly from the center line of the frame member when employing a chamber of about 12-13 inches in diameter (when expanded).

In the aforesaid copending application, the means for taking up the horizontal force components of braking and dynamic operating forces can take several forms. Generally however, such means comprise either the leaf springs themselves, as by shackling one end thereof to the spring hanger means, or a radius rod extending in either the forward or the rearward direction from the axle.

Braking and dynamic operating forces are known forces in the vehicle art and the use of this term is used herein in accordance with its known meaning. Braking forces are those which occur during braking or stopping of the vehicle while the dynamic operating forces are those which occur, for example, when the vehicle contacts a pot-hole, bump, curb or the like.

The term "substantially directly under" as it applies to the location of the means for taking up the horizontal force components (referred to at times and for convenience as horizontal force component means) is used in that aforesaid copending application, and is used herein, to mean that such means are so located as to effectively translate, in a substantially noneccentric way, the said force components into the load bearing members of the vehicle designed to handle such forces, i.e., the the frame members. As further disclosed in that application, in those preferred instances where such means are comprised of the leaf spring or radius rod, such substantially noneccentric translation is usually achieved by locating the spring or rod in such a way that at least one vertical plane defined by one of the extremities of the leaf spring or rod falls between the vertical planes of the horizontal extremities of the frame members, or vice versa. In other words, that there be horizontal overlap between the spring or rod in the frame member. More precise centering for maximum effect differs depending upon various design contingencies. Generally speaking, however, it is usually preferred when employing conventional C, L or I frame members and leaf springs or radius rods of conventional width, to locate the spring or rod such that the "center line" (i.e., neutral axis or center of gravity) of the leaf spring or rod will fall between the vertical planes of the horizontal extremities of the frame member. In the most preferred forms, the center line of the spring or rod is vertically aligned as closely as possible with the "center line" (i.e., neutral axis or center of gravity) of the frame member. As will be seen hereinafter, the same criteria hold true in regards to this invention, which in its preferred embodiments employs the springs as the means for taking up the horizontal force components of braking and dynamic operating forces.

This unique high strength improvement on the basic "positive return" system as described in application number 336,289 is advantageously used over a wide range of frame heights including relatively high, relatively low, and inordinately low frames. However, in practice, it was found that in regards to various wheeled vehicles having frames in the lower range of the "inordinately low" frame to ground clearances (i.e., about 24 inches or less), some tendancy for the system to scrape ground when the wheel was in the road engaging position was being experienced. This was due primarily to the fact that while the system provided excellent strength, in part due to a uniquely designed load arm which enabled "centering" of the springs and bags as described, certain parts within the load arm extended toward the ground so far that, when the axle was lowered for operation, these parts tended to, at times, hit ground on bumps and the like. Such parts where generally those rather critical parts which helped secure the load arm to the axle.

Such a problem has become increasingly undesirable, since there has been a tendancy in recent years, which tendancy appears to be accelerating, for certain segments of the industry to produce and the consuming industry to demand, wheeled vehicles of ever-decreasing frame heights. Generally speaking such wheeled vehicles are trucks and semi-trailers, which are being built with frames about 24 inches from the ground. The vast majority of these vehicles, furthermore, are large vehicles which can carry great amounts of weight and thus require a lift axle which is itself certifiable as being able to carry its share of the load. Its share of the load, furthermore, usually means that the axle must be certifiable in accordance with various regulations at greater than about 18,000 pounds per axle.

From the above, it is apparent that there exists a definite need in the art for a high strength, low frame axle suspension system which employs the "positive return" aspects of the unique devices hereinabove described but at the same time overcomes the "bottoming-out" problem experienced with the aforementioned device when the device is installed on frames in the lower range of inordinary low frames (e.g., about 24 inches).

It is the purpose of this invention to fulfill this need in the art as well as other needs which will become more apparent to the skilled artist once given the following disclosure.

This invention fulfills the above-described needs by providing a unique system which includes a redesigned load arm mechanism that achieves the same "centering" functions of the uniquely designed load arm system in the aforementioned copending patent application, but which at the same time provides a mechanism whereby the means which secure the load arm to the axle do not extend downwardly below the horizontal plane of the load arm. By such a configuration, a significant increase in ground clearance is achieved, which increase greatly alleviates, and in most instances substantially eliminates, the ground scraping problem hereinbefore described.

Generally speaking, the load arm employed in this invention comprises a leaf spring retaining means and means for securing the load arm to the auxiliary axle of said vehicle (e.g., as by bolt means). The spring retaining means comprises a generally horizontal bottom portion and a pair of vertical walls connected to and extending upwardly from the horizontal portion, thereby defining a spring retaining area therewithin. The means for securing the load arm to the auxiliary axle are located in the vertical walls of the load arm such that the means connecting the axle to the securing means (e.g., the bolt means) do not extend substantially below the plane of the horizontal bottom portion of the load arm thus to achieve the desired results. In addition, such securing means are well established in the vertical walls so that no point of substantial weakness is presented, thereby to provide the necessary high strength for the unit.

The significance of this savings of space to prevent ground scraping is best exemplified by reflection upon the load arm mechanism employed in the practice of the copending patent application cited above. In practice, the bolt means which connect the axle to the securing means of the load arm, normally extend approximately 3 inches below the horizontal plane of the load arm. In flexing the spring so as to drive the wheel into its road engaging position, the spring travels approximately 5 inches and thus extends downwardly below the lower horizontal plane of the spring hanger brackets. As can be seen, a savings of 3 inches, with retention of strength, represents a significant and desirable improvement to those truck and trailer owners who use trucks bearing only about 24 inches of clearance between ground and frame, which vehicles must employ lift axle systems in order to carry maximum weight (for economic purposes) and at the same time satisfy the many highway laws in regards to weight per axle.

This invention will now be described with reference to certain embodiments illustrated in the appended drawings wherein:

Figure 1:
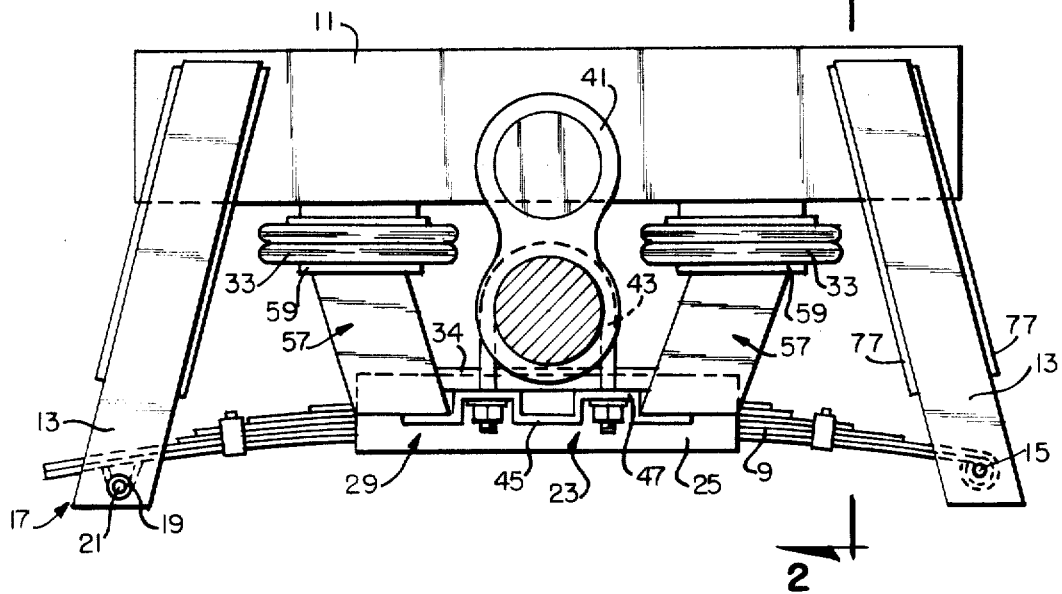
FIG. 1 is a side plan view of an auxiliary axle suspension system as contemplated by this invention.

FIG. 1 illustrates a particularly preferred embodiment of the invention described hereinabove. In this figure there is illustrated an angle bracket 11 for connecting the axle suspension system to a frame member 1 (FIG. 2) of a wheeled vehicle. From either end of angle bracket 11 there extends in a downward direction and at diverging angles, spring hanger brackets 13 which connect leaf spring 9 by its end to the chassis of the vehicle. Leaf spring 9 is a multi-leafed spring connected at one end (usually the forward end of travel of the vehicle) by a tightly wrapped eye indicated at 15. Spring 9, at its other end, is a free end connection held in place by the preload on the spring, and slidably engaged with rocker block 19 which is rotatable about pin 21. Rocker block 19 serves as a runway or slide mechanism upon which the end of spring 9 may slide during operation of the device.

Within this system there is provided a unique load arm mechanism 23 which generally comprises (as further illustrated in FIG. 2) a horizontal spring retaining cup 25 comprised of a horizontal bottom portion 27 and vertically extending walls 29 so as to define therewithin a spring retaining area. Saddle 28 forms a seat for axle 41 to ride on, and rests upon the upper leaf of spring 9. Spacer block 30 may be provided below spring 9 to, in cooperation with saddle 28, insure a snug fit and thus prevent undue vibration and movement of spring 9 in cup 25.

Integrally and strongly connected (as by welding) with vertically extending walls 29 there is provided securing means 31 for securing the load arm 23 to drop axle 41 by means of connecting U-bolts means 43. These securing means 31 may be of a single cast section having vertical walls of diminishing width and an upper horizontal wall, as illustrated in FIG. 4a or, as illustrated in Flg. 4 it may be of a corrugation design.

Figure 4:
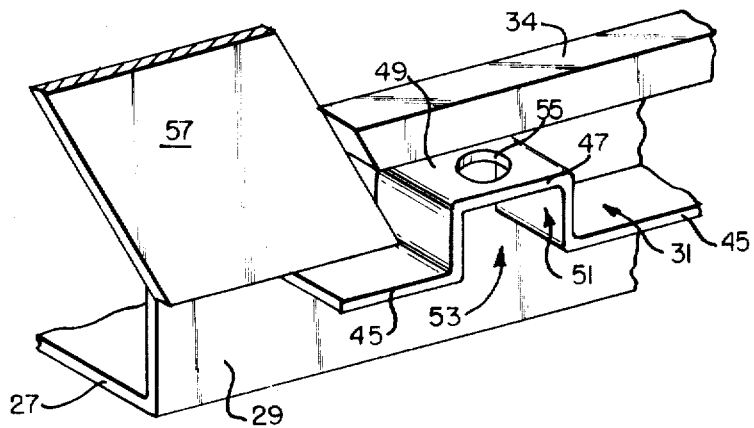
FIG. 4 is a partial prospective view of a load arm as contemplated by this invention.
Figure 4A:
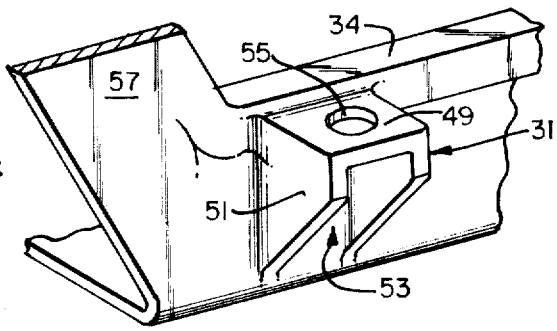
FIG. 4a is a partial prospective view of a further embodiment of a load arm as contemplated by this invention.

Corrugated securing means 31 is comprised in FIG. 4 of lower horizontal portions 45, and upwardly raised portions 47. Upwardly raised portions 47 comprise a horizontal bolt retaining flange 49 and vertically extending walls 51, thereby defining a securing means chamber 53. Within the horizontal bolt retaining flange 49, there is provided a bolt conduit 55. In this way, axle 41 is secured to substantially the central portion of load arm 23 by threaded U bolts 43 which over-ride at their U end, axle 41 and which are secured by conventional nut means at their threaded end within chamber 53. In the cast design of FIG. 4a there are no lower horizontal portions 45 and the casting makes the flange and bolt chamber integral with the load arm wall. Preferably walls 53 in the casting are downwardly diverging for simplicity of manufacture. Of the two designs, the cast arm of FIG. 4a is somewhat preferred from the point of view of increased strength.

In the corrugated securing means, FIG. 4, from both of the end lower horizontal portions 45, there rests upon, and extends above, upwardly extending and diverging load arms 57. In practice, load arms 57 not only rest upon horizontal portions 45, but for further strength and security are weldedly connected to walls 29 and may be provided with reinforcing strips 34. In the cast form (FIG. 4a), load arms 57 extend upwardly in the same way, but instead of being welded to walls 29, they are connected thereto because thay are an integral part of (actually a continuum of) walls 29. Each of these upwardly extending load arms 57 terminates in a platform 59 which has located thereon expandable air bags 33. Air bags 33, in turn, are securedly attached to the underside flange of angle bracket 11.

Air bags 33 are of conventional design in the industry. As illustrated, air bags 33 are preferably of the convaluted design and usually employ bumpers therewithin as the stop mechanism for the upper limit of the flexing of spring 9.

Figure 2:
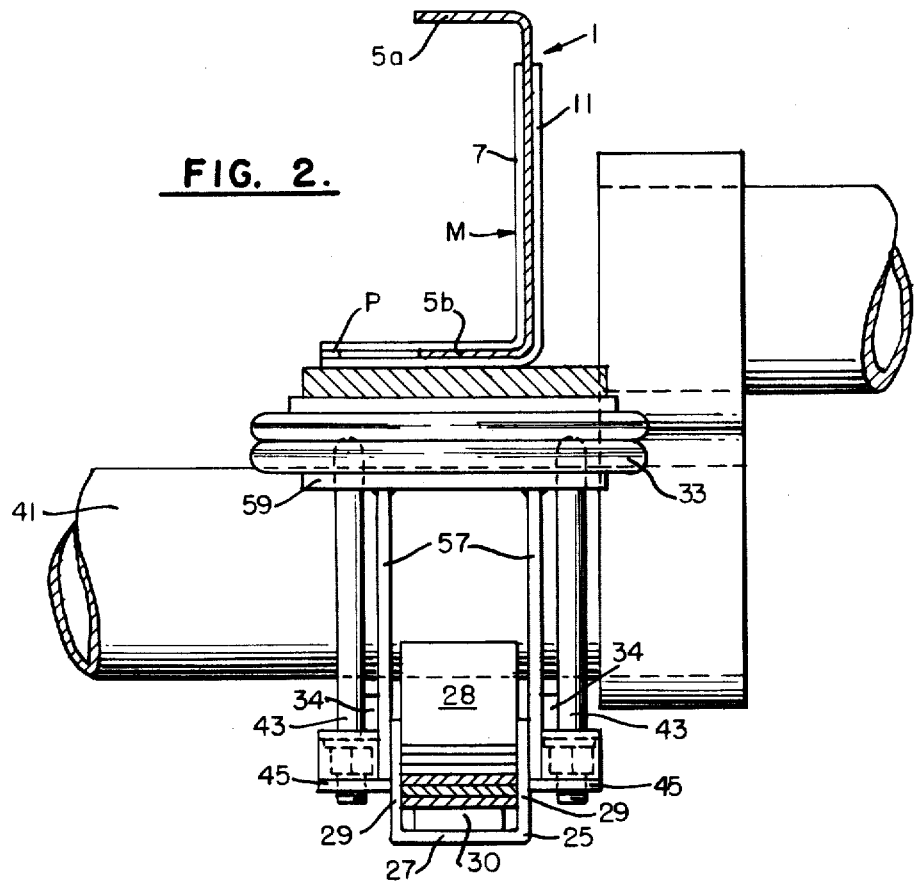
FIG. 2 is a partial front plan, partially sectionalized view taken along line A—A of FIG. 1.
Figure 3:
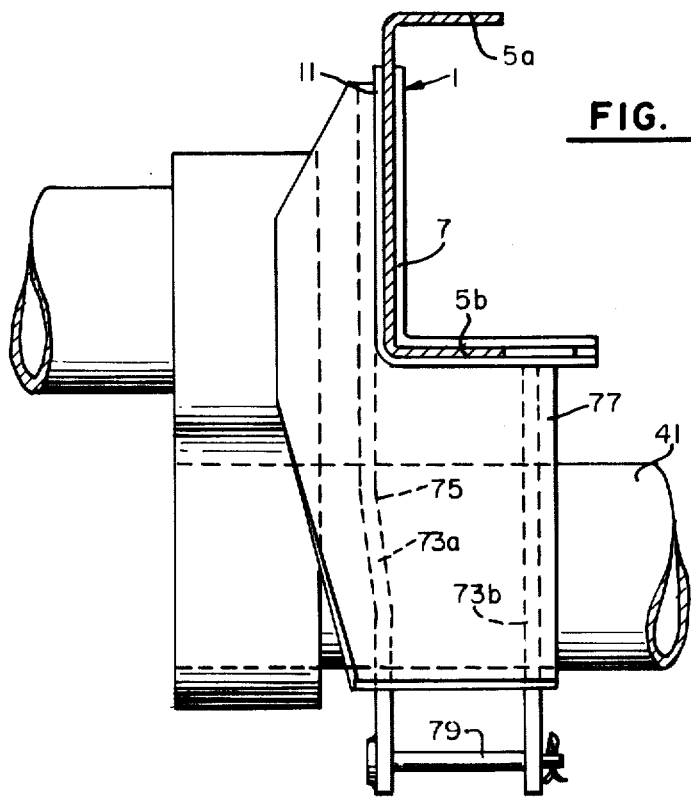
FIG. 3 is a partial front plan view, partially sectionalized, of the hanger bracket mechanism (without the springs illustrated therein) of the device illustrated in FIG. 1.

In certain preferred embodiments of this invention, and as best illustrated in FIGS. 2 and 3, the frame member of any truck or trailer, upon which this device installed, as illustrated by frame member 1, is connected to the device of this invention without violating its horizontal flanges 5a or 5b. This is done in accordance with the teachings of U.S. Pat. No. 3,617,072 by providing an internal angle bracket 7 such that the horizontal flanges of brackets 7 and 11 extend beyond the extremities of flange 5b thus to enable bolting or other means of securing at a point represented at P well beyond these extremities. It has been found that such a mechanism uniquely prevents undue stresses or other problems in regards to frame member 1. In practice, and without difficulty, the vertically extending leg of frame member 1, bracket 7, and bracket 11 may be bolted such as at point M.

Referring to FIG. 3, there is illustrated a front view of spring hanger bracket 13. As illustrated, spring hanger bracket 13 comprises two downwardly extending legs 73a and 73b. In the preferred embodiment of this invention, downwardly extending leg 73a is angled inwardly at point 75 so as to keep the springs substantially directly under (as that term is defined herein) the frame member 1 of the vehicle.

Rigidly secured to the forward portion and rearward portion of legs 73a and 73b are reinforcing plates 77. As illustrated, legs 73a and 73b are attached at their lower termination by pin 79 about which tightly wrapped eye 15 is secured. Of course, on the other end of the suspension, pin 79 would be provided with rocker block 19 as illustrated in FIG. 1.

As can be seen from the above, the correct positioning of securing means 31 on vertically extending walls 29 so as to provide a retaining chamber 53 of sufficient magnitude so that bolts 43 do not extend substantially below horizontal portion 27, enables the device in practice, to overcome the bottoming-out problem. That is to say, when the device is flexed by expanding air bags 33 so as to drive axle 41 downwardly against the upward bias of spring 9 until wheel 63 hits the road surface, spring 9 flexes so as to drive load arm 23 downwardly past the lower horizontal plane of spring hanger brackets 13. Thus horizontal bottom portion 27 becomes the determining factor as to the ground to suspension clearance when the device is placed into operation. Heretofore, and as described above, this ground-to-frame clearance was approximately 3 inches greater in view of the bolting mechanism heretofore employed. On the other hand, by the unique load arm mechanism and securing means now employed, a savings in space of 3 inches or more is achieved while the unique features of certifiable strength are still retained.

Figure 5:
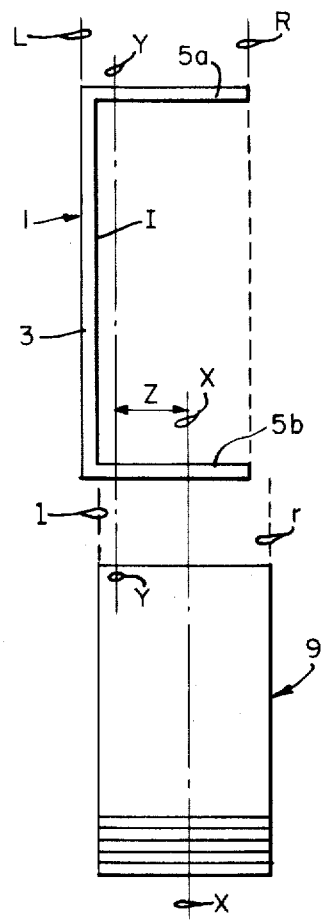
FIG. 5 is a rear-view schematic illustrating the "substantially directly under" nature of the springs as contemplated by this invention.
Figure 6:
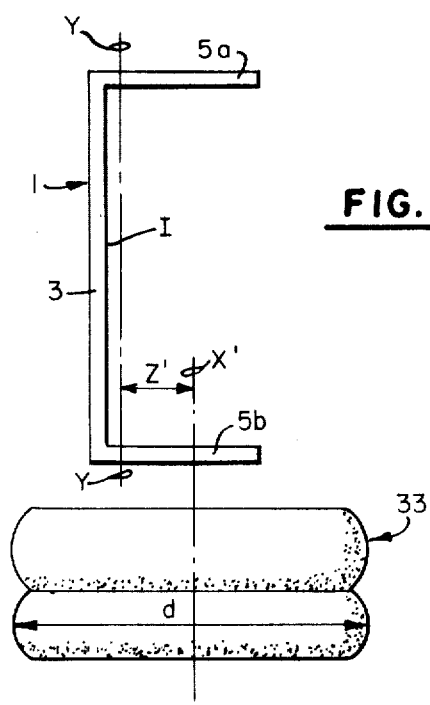
FIG. 6 is a rear-view schematic illustrating the in a "spread configuration" nature of the pneumatic chambers as contemplated by this invention.

In regard to the preferred embodiments of this invention, and the achievement of certifiable strength, attention is now directed to the schematic illustrations of FIGS. 5 and 6 wherein the "in a spread configuration" (FIg. 6) and "substantially directly under" (FIG. 5) nature of this invention are illustrated. FIG. 5 illustrates the concept of "substantially directly under" as it relates to leaf spring 9. FIG. 1, of course, illustrates but one side of a wheeled vehicle. In the normal instance, the wheeled vehicle (such as a truck or semi-trailer) has two frame members extending longitudinally on either side thereof, and the suspension illustrated in FIG. 1 is duplicated on the other side of the vehicle, with drop axle 41 extending therebetween.

As illustrated in FIG. 5, the extremities of frame member 1 are defined by planes L and R. In this instance a C-beam is illustrated and thus the outer extremities are defined on the left by the left hand surface of vertical member (web) 3 and on the right by the right hand surface of equally wide horizontal flanges 5a and 5b. Line Y—Y then defines the center line (i.e., neutral axis for center of gravity) of frame member 1. As an example of a typically employed truck or trailer frame member, C-beam 1 would be about ¼ inches thick, web 3 would be about 10 inches, while legs 5a and 5b would be approximately 3 inches. In such a beam, center line Y—Y is almost contiguous with internal surface I of web 3.

In like manner, planes 1 and r define the outer extremities of spring 9. In accordance with the teachings of this invention, in order for spring 9 to be considered "substantially directly under" the frame member, either 1 or r should fall within L and R or vice versa (such as where spring 9 is wider than flange 5b). In other words, the vertical planes of the extremities of spring 9 and frame member 1 must in some way overlap in the horizontal direction. As illustrated, this is accomplished by presenting 1 to the right of L.

In more preferred forms, more precise centering of spring 9 under frame member 1 is desirable. Generally, more precise centering may be defined by the requirement that center line X—X lie between planes R and L. Even more precise centering may be defined by reference to distance Z (which may lie either to the right or left of line Y—Y) which as illustrated, defines the distance between frame member center line Y—Y and spring center line X—X. In general Z should be less than about 2 inches and preferably less than about 1½ inches.

FIG. 6 best illustrates what is meant by the concept that chambers 33 are to be located "in a spread configuration." This is best accomplished by reference to distance Z' and its relation to diameter d of chambers 33 in expanded form. Distance Z' as illustrated is that inwardly extending distance between center line Y—Y (as discussed with reference to FIG. 5) and center line (i.e. neutral axis or center of gravity) X'—X' of chambers 33.

Generally speaking, to be considered "in a spread configuration" in accordance with this invention, the distance Z' should not be greater than about 20 percent of d and preferably not greater than about 10 percent. Strength and other beneficial factors increase the smaller Z' becomes. While it may not always be practical to have Z' substantially equal to zero or actually a negative value (such as when the bags would be located somewhat outboard of frame member 1), generally speaking excellent results are achieved if Z' is not more than about 1¾ inches and preferably less than 1 inch on air bags where d is about 12-13 inches.

Figure 7:
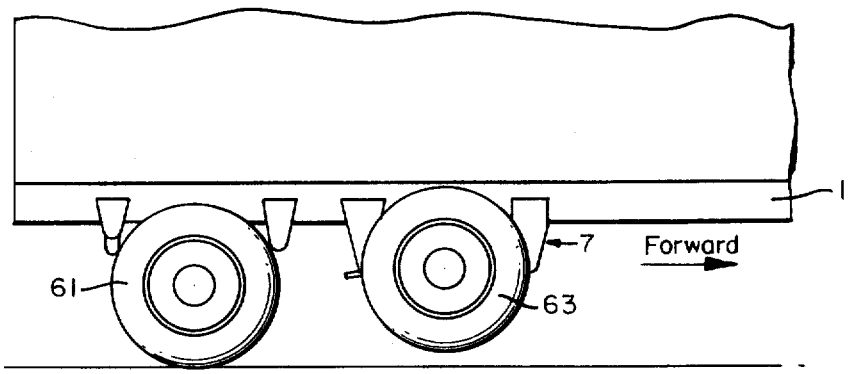
FIG. 7 is a fragmentary side elevational view of the rear portion of a wheeled vehicle embodying this invention, the auxiliary axle being shown in a non-load bearing position relative to the vehicle.
Figure 8:
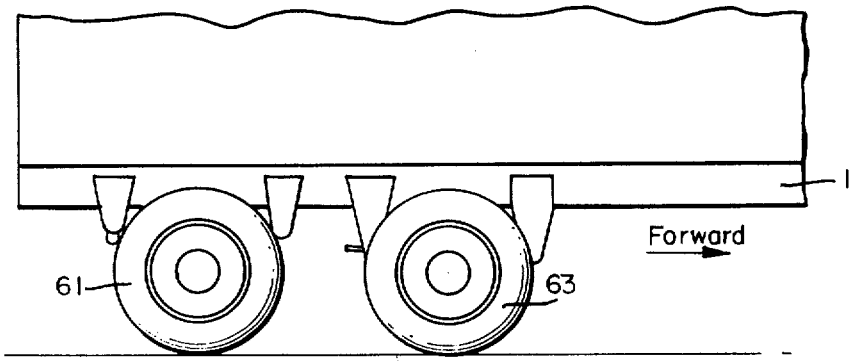
FIG. 8 is a view similar to FIG. 7 but with the auxiliary axle being shown in its load bearing position relative to the vehicle.
Figure 9:
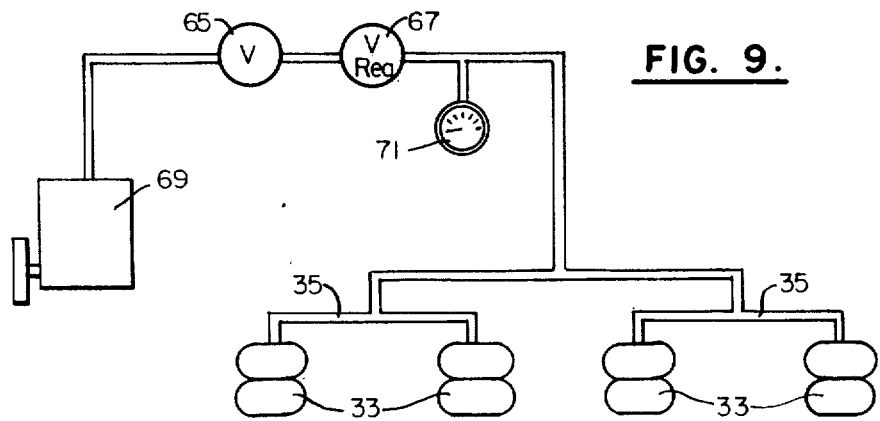
FIG. 9 is a diagrammatic view of one example of means for controlling operation of the auxiliary axle systems of this invention.

Referring now to FIGS. 7-9, there is illustrated the operation of the subject invention as it applies to a wheeled vehicle having a stationary wheeled axle 61 as a primary means of support and an auxiliary axle suspension system of this invention. As illustrated in FIG. 7, the auxiliary axle suspension systems of this invention, illustrated at 7, normally bias auxiliary axle 41 (in this instance a drop axle so as to insure proper lifting height) upwardly so as to hold wheels 63 from engagement with the road surface, and this is true despite the fact that the wheeled vehicle may have a frame member 1 built at approximately 24 inches from the ground.

By using a valve and line mechanism such as that illustrated in FIG. 9, to provide air to lines 35, auxiliary axle 41 may be forced downwardly to bring wheel 63 into engagement with the road surface as illustrated in FIG. 8. For example, with wheels 63 in their normally retracted position (FIG. 7), the driver of the vehicle may actuate, preferably from the driver's cab, manual control valve 65. Through regulating valve 67, compressed air from compressor 69 is sent via lines 35 to flexible pneumatic chambers (air bags) 33. The desired pressure is maintained by valve 65 and recorded on gauge 71. As air is admitted to chambers 33, they expand vertically, forcing load arm means 23 against leaf spring 9, driving leaf spring 9 and axle 41 downwardly until wheels 63 contact the road surface. When wheels 63 are no longer needed as load bearing, valve 65 is activated to relieve the air pressure in chambers 33, and the normal upwardly biasing force of springs 9 return axle 41 to its retracted position.

The above described suspension systems are very strong and reliable and may be used wherever auxiliary axle suspension systems are necessary and where inordinately low frames are present—with the safeguard of adequate clearance when wheel 63 is in its road engaging position so as to prevent against ground-scraping. In particularly preferred embodiments of this invention, particularly those specifically described hereinabove, the suspensions of this invention are certifiable for carrying loads greater than about 18,000 pounds per axle and often at about 20,000 pounds per axle.

Once given the above disclosure, many other features, modifications and improvements will become apparent to the skilled artisian. Such other features, modifications and improvements are therefore considered to be a part of this invention, the scope of which is to be determined by the following claims.

I claim:

1. An auxiliary axle suspension system certifiable for carrying loads greater than about 18,000 lbs./axle and for mounting on a wheeled vehicle having two outer, longitudinally extending inordinately low frame members, the system comprising,
   a. an upwardly biased leaf spring for locating substantially directly under each outer frame member and extending in the longitudinal direction thereof, each leaf spring being connected to hanger members which when installed, extend substantially vertically from beneath each outer frame member,
   b. a load arm mechanism for each leaf spring comprising a leaf spring retaining means defined by a substantially rectangular three sided longitudinally extending box wherein said horizontal bottom portion comprises the lower side of said box and a pair of vertical walls comprises the two sides of said box, and there is provided at substantially the end portions of each of said vertical walls, upwardly extending arm means which terminate in platform means having located thereon expandable pneumatic chamber means,
   c. said load arm mechanism further comprising self-supportive U-bolt retaining means located on and extending outwardly from each of said vertical walls of said leaf spring retaining means and between the arm means of a given vertical wall, said U-bolt retaining means being comprised of two horizontally disposed chambers connected by a single integral flange, said flange defining at least an upper horizontal top for each of said chambers, and each top have located therein an orifice through which the legs of a U-bolt can extend, said U-bolt retaining means being located on the upper portion of said vertical walls such that the lower surfaces of said chambers do not substantially extend into the lower portion of said vertical walls,
   d. at least two U-bolt means for each load arm mechanism for connecting an auxiliary axle to said load arm mechanism, said U-bolts having legs of sufficient length to extend through said orifices of said chambers but not below said horizontal bottom portion,
   e. each leaf spring being retained at about its center portion by said spring retaining means of said load arm mechanism in a normally upwardly biased position such that wheels attached to the axle are normally held above the road surface when the system is installed, two vertically flexible pneumatic chambers located between each leaf spring and its respective frame member, one pneumatic chamber being supported on each of said platforms, one located forward and one aft of said U-bolt retaining means, said load arm mechanism, when installed, locating said chambers in a spread configuration and said springs substantially directly under the frame member, such that when pneumatic pressure is applied to the chambers they elongate, forcing the axle downwardly against the upward bias of the spring to engage the wheels of the vehicle with the road surface.

* * * * *